Dec. 15, 1953         J. CHARLTON         2,663,017
GLIDE PATH SELECTOR FOR BLIND LANDING SYSTEMS
Filed Sept. 26, 1951         2 Sheets-Sheet 1
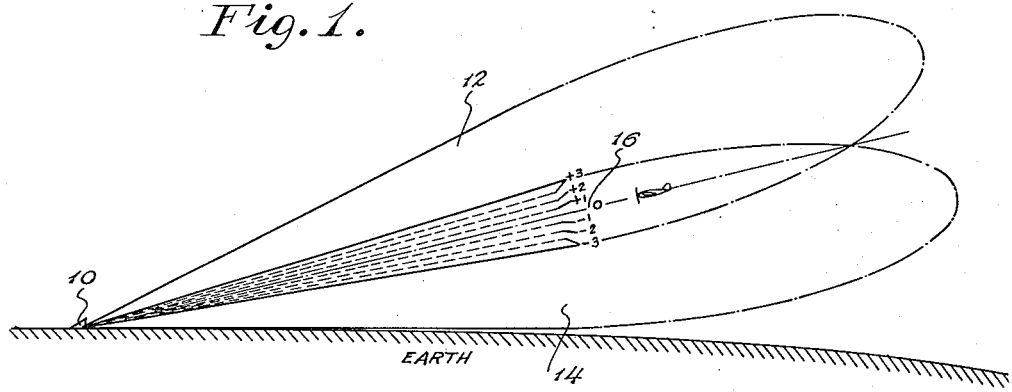
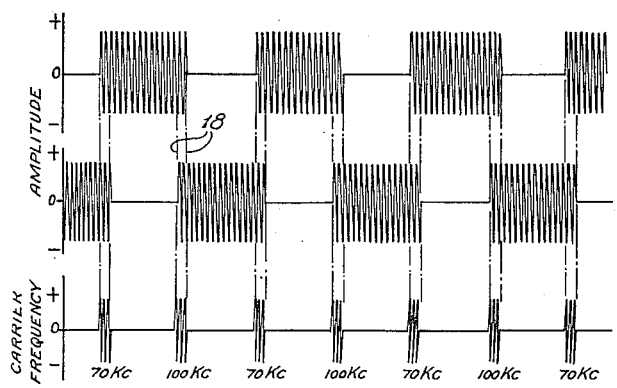
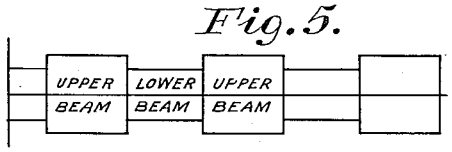
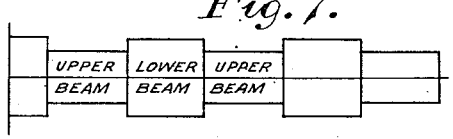
INVENTOR
JOHN CHARLTON
BY
ATTORNEY Dec. 15, 1953  J. CHARLTON  2,663,017
GLIDE PATH SELECTOR FOR BLIND LANDING SYSTEMS
Filed Sept. 26, 1951  2 Sheets-Sheet 2

INVENTOR
JOHN CHARLTON
BY
Paul B. Hunter
ATTORNEY

Patented Dec. 15, 1953

2,663,017

UNITED STATES PATENT OFFICE 2,663,017

GLIDE PATH SELECTOR FOR BLIND LANDING SYSTEMS

John Charlton, New York, N. Y., assignor to The Sperry Corporation, a corporation of Delaware Application September 26, 1951, Serial No. 248,420

11 Claims. (Cl. 343—108)

This invention relates to navigation systems, and more particularly to an aircraft instrument landing receiver adapted to produce a visual or electrical indication of the displacement of the aircraft from an electromagnetically defined instrument landing path.

Various systems have been proposed in the prior art in which an electromagnetically defined flight path is utilized for guiding an aircraft to a "blind" landing. Such a flight path usually is defined in space by the intersection of a predetermined vertical plane and a plane at right angles and inclined at a slight angle with the horizontal. Such a plane in space may be established by a pair of overlapping microwave radio beams, the equisignal zone of the overlapping beams essentially defining a straight-line path which is indicated by suitable receiver apparatus carried by the aircraft. The information so derived is used to visually indicate the deviation of the airplane's position with respect to the established flight path, or is fed to the autopilot for automatically controlling the landing. One such system is described in the pending application Serial No. 724,383, filed January 25, 1947 by Richard Proskauer now Patent No. 2,602,161 issued July 1, 1952.

Because different types of aircraft operating under various landing conditions require different glide angles in their landing approach, it is desirable to provide some means for selecting any one of a number of predetermined flight paths of varying glide angles. One method heretofore proposed has been to regulate the position of the transmitter horns to vary the space positions of the overlapping beams, thereby adjusting the flight path defined by the equisignal zone. However, such method is open to the objection that it is not readily controllable by the pilot of the aircraft, it being more advantageous that the pilot of the particular aircraft be able to select any suitable glide angle as he sees fit.

Another method heretofore proposed has been the introduction of a predetermined error signal by means of which a fixed displacement may be introduced into the system by a summing circuit, and usually takes the form of a "course adjusting voltage" added to the output circuit driving the indicating meter. In such arrangement the aircraft must be flown off the course a sufficient amount to produce a deviation error which exactly overcomes the predetermined deflection of the meter by the added course adjusting voltage. Thus an on course condition is indicated on the instrument when the aircraft is flown on a course deviating from the basic equisignal glide path by a predetermined amount depending on the selected voltage. However, any variation in the amplifier gain, detector efficiency, and/or automatic gain control characteristics of the receiver (or from receiver to receiver) prior to the summing circuit affects the reading of the indicating meter and thereby affects the glide path followed by the airplane. Thus, it has not proven to be reliable nor accurate to add a fixed predetermined voltage to the summing circuit to establish a new glide path.

The general object of this invention is to avoid and overcome the foregoing and other difficulties in and objections to the prior art practices by the provision of an aircraft instrument landing receiver for guiding an aircraft relative to a fixed reference path in space.

Another object of this invention is to provide an apparatus for guiding an aircraft over any chosen path of fixed relation to the reference path.

Another object of this invention is the provision of glide angle selector means in combination with an instrument-landing receiver by means of which any one of a number of glide angle approaches may be selected.

Another object of this invention is the provision of a glide angle selector which may be manually operated by the pilot for choosing the course preferred by him to that normally defined by the equisignal path.

These and other objects of the invention which will become apparent as the description proceeds, are achieved by providing in combination an aircraft instrument-landing superheterodyne receiver having an I. F. (intermediate frequency) amplifier and adapted to produce a visual indication of the displacement of the aircraft from an electromagnetically defined instrument landing path, and means for providing manual selection of any one of a number of landing paths of predetermined fixed displacement from the electromagnetically defined landing path. The selector means includes a multivibrator, a step-type grounded center-point attenuator, opposite ends of the attenuator being respectively coupled to opposite phases of the multivibrator, and a selector switch connecting any of the step portions of the attenuator to one or more stages of the I. F. amplifier for varying the stage gain whereby the amplitude of the I. F. carrier is square wave modulated a predetermined amount.

With the overlapping radio beams being alternately energized at the same switching rate as the gain modulating square wave, the gain for the signal from one beam is greater than for the signal from the other beam. A phase detector is provided for driving an indicating meter, the output of the phase detector being proportional to the difference in amplitude of the signals from the two beams after amplification and of polarity determined by the phase of the two beam signals. An "on course" indication results when the apparent amplitude of the two signals as modified by the gain modulation is the same.

For a better understanding of the invention reference should be had to the accompanying drawings, wherein:

Fig. 1 is a diagrammatic view illustrating a pair of overlapping beams of electromagnetic radiation defining a substantially straight equisignal glide path;

Fig. 2 is a graphical representation of the modulated space signal in the upper beam;

Fig. 3 is a graphical representation of the space signal in the lower beam;

Fig. 4 is a graphical representation of the frequency modulated reference signal which is used to synchronize the local reference voltage generator of the receiver;

Fig. 5 is a graphical representation of the modulated carrier signal at the antenna of the receiver when the aircraft is flying above the equisignal reference path;

Fig. 6 is a graphical representation of the resulting signal at the output of the AM detector.

Fig. 7 is a graphical representation of the modulated carrier signal at the antenna of the receiver when the aircraft is flying below the equisignal reference path;

Fig. 8 is a graphical representation of the resulting signal at the output of the AM detector.

Figure 9:
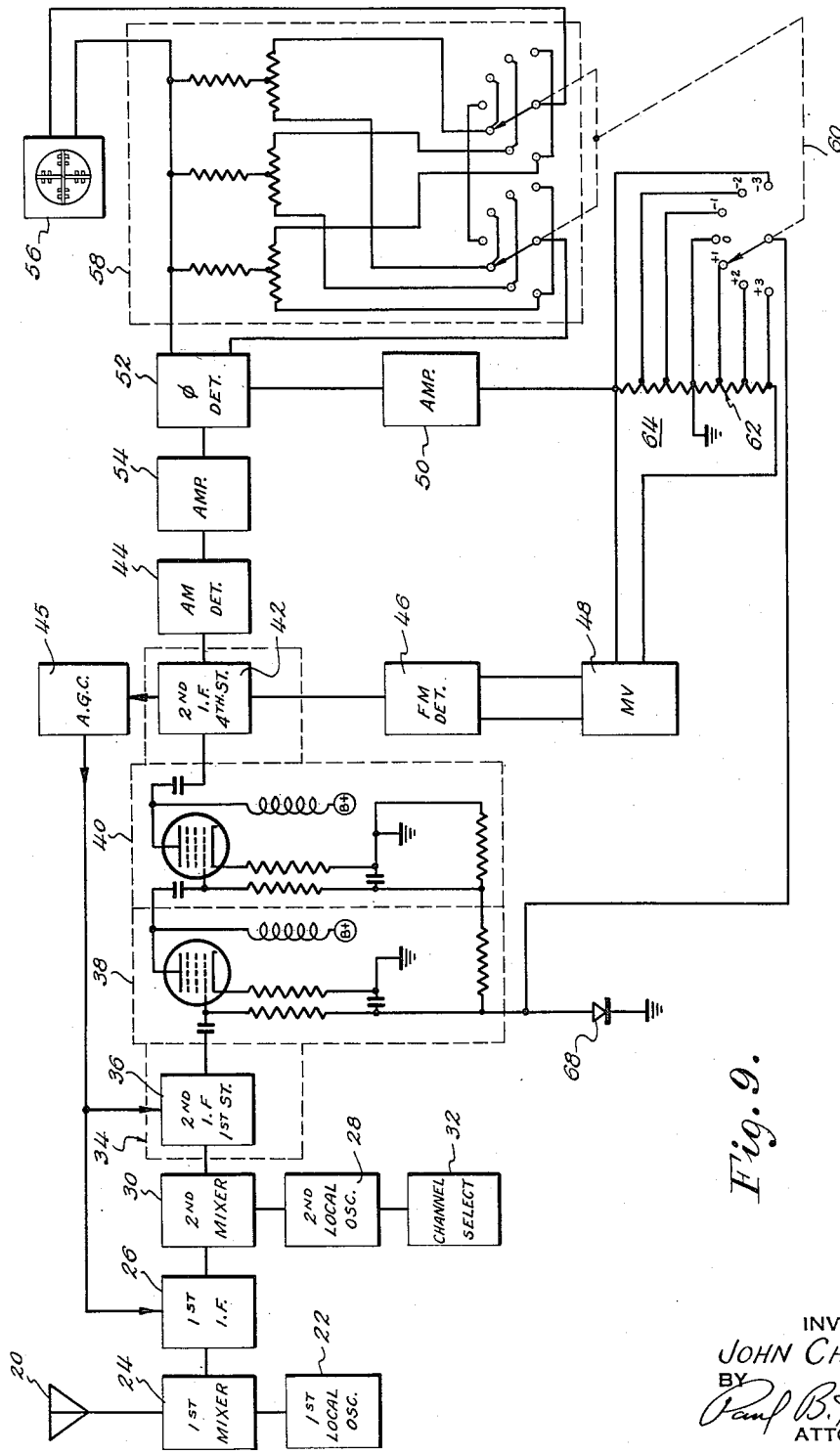
Fig. 9 is a partial block diagram and schematic diagram of the receiver circuit.

Referring to the form of the invention illustrated in the drawings, the numeral 10 (Fig. 1) indicates the transmitter horn, which normally is positioned at one side of an airport landing strip. The horn sets up by means of a suitable transmitter (not shown) an electromagnetic directivity pattern including two overlapping lobes or beams 12 and 14. The transmitter generates preferably a 5000 mc. signal which is alternately transmitted in each of the lobes, as indicated in Figs. 2 and 3. Actually the transmitter is designed to provide a short time interval of overlap during which time the carrier is simultaneously transmitted in both lobes, as shown by the dotted lines 18. The indicated time of overlap is, of course, greatly exaggerated in the drawings. The carrier provides a square wave modulated signal in each of the two lobes which is 180° out of phase with that of the other lobe. Energy received from each lobe is equal along a path defined by the line 16, which represents the equisignal reference glide path. By comparing the energy received from one beam with that received from the other, the amount of deviation of the aircraft from the plane of the reference path may be ascertained. See Figs. 5 and 7.

To provide sensing means for determining if the aircraft is above or below the reference glide path 16, the carrier is frequency modulated alternately by two reference signals of 100 kc. and 70 kc. during the intervals the two beams are simultaneously transmitted, as shown in Fig. 5. Thus, the reference signals are available in either lobe, and are used to actuate a sensing circuit in the receiver whereby the phase of the square wave modulated carrier signal can be ascertained. It will be understood that if the aircraft is above the reference path 16, the phase of the square wave modulation of the carrier at the receiver will be determined by the predominant upper beam signal, while if the aircraft is below the reference glide path 16, the phase will be shifted by 180° as determined by the predominant lower beam signal. See Figs. 6 and 8.

The operation of the receiver can best be understood by reference to the block diagram of Fig. 9 in which the input signal is picked up by an antenna 20. The carrier frequency of the incoming signal, of the order of 5000 mc., is beat with a local oscillator 22 in a mixer circuit 24 and fed to the first I. F. amplifier 26. A second local oscillator 28 and mixer 30 are preferably provided for obtaining a channel selection where more than one carrier frequency is employed. Such a channel selector is indicated at 32. However, it is to be understood that, while a double heterodyne receiver system has been shown, the invention is equally adaptable to a single heterodyne system.

The output signal of the second mixer 30 is applied to a second I. F. amplifier indicated generally at 34, the I. F. amplifier 34 preferably including four stages of amplification 36, 38, 40 and 42. The output of the second I. F. amplifier 34 is applied to a conventional amplitude modulation detector 44. The output of the AM detector is essentially a square wave having an amplitude proportional to the amount of displacement of the aircraft position above or below the reference guide path 16, as shown in Figs. 6 and 8.

An automatic gain control rectifier circuit 45 develops gain control voltage as determined by the signal level at the AM detector 44, the gain control voltage being applied to control the bias of the grids of various stages in the first and second I. F. amplifiers in a well known manner.

The output of the I. F. amplifier 34 is also applied to an FM detector-discriminator 46 which separates out the 100 kc. and 70 kc. frequency modulated reference signals and produces reference pulses therefrom.

A multivibrator 48 generates a local square wave signal which is synchronized by the reference pulses at the output of the FM detector 46. The square wave signal is coupled through a reference amplifier 50 to a phase detector 52 that compares the phase of the reference square wave with the output signal of the AM detector 44 as amplified by the amplifier 54. The output of the phase detector 52 is a D. C. error voltage of a magnitude proportional to the difference in amplitude of the two square wave modulated upper and lower lobe signals, and having a polarity determined by the relative phase of the predominant lobe signal with respect to the square wave reference voltage. The D. C. signal is applied to a cross-pointer meter 56 to control the up and down position of the indicator, through a sensitivity control 58 to be hereinafter described, or the D. C. signal can be connected directly to the autopilot system for automatic flight control. The meter gives a visual indication of the position of the aircraft relative to the reference glide path.

The apparatus for permitting selection of the desired glide angle will now be described. A three-pole multi-throw switch, indicated generally at 60, is provided, having one set of poles connected successively to the various steps of a fixed-resistor type attenuator 62. One pole is connected to the midpoint of the attenuator which in turn is grounded, as at 64. The ends of the attenuator 62 are connected respectively to opposite phases of the square wave generator 48. The square wave generator is of the usual bistable multivibrator type which is triggered alternately by the pulses derived from the frequency modulating 70 kc. and 100 kc. reference signals. Thus, the square waves generated in the plate circuits of the multivibrator are synchronized by the transmitter, and the resulting voltage signals appearing across opposite legs of the grounded center-point attenuator 62 are 180° out of phase, the voltage across one leg being in phase with the modulating signal in the upper lobe 12 and the voltage across the other leg being in phase with the modulating signal of the lower lobe 14.

The selected voltage on the attenuator 62 is connected by means of the switch 60 preferably to the control grid circuits of the second and third stages 38 and 40 of the second I. F. amplifier, as shown in Fig. 9, whereby the gain of these stages may be appropriately modulated. A diode 68 ties the grid circuit of the I. F. stage 38 to ground for correcting distortion resulting from injection of the gain modulating signal derived from the attenuator 62 by preventing the modulating signal from going positive and driving the associated grid conductive.

Switch 60 simultaneously switches into the circuit, between the output of the phase detector 52 and the cross-pointer meter 56, a T-pad attenuator 58 which automatically adjusts the sensitivity of the meter 56 depending on the selected glide angle. Each glide path is preferably provided with a different sensitivity to accommodate the space pattern limitation as the aircraft flies either far above or far below the equisignal reference path. Thus a separate attenuator is provided for each different glide angle on either side of the reference glide path.

While it is believed that the operation of the glide angle selector and associated receiver sections is clear from the above description, a brief review of the operation is given below by way of summary. The carrier signal received at the input of the I. F. amplifier is modulated by two square wave signals which are 180° out of phase. These two modulation signals are derived from the upper and lower electromagnetic beams 12 and 14 as the aircraft flies in the overlapping region. Assuming the aircraft is exactly on the equisignal reference path 16, the two modulation signals are equal in magnitude. The resulting signal at the output of the AM detector 44 is zero, and the meter 56 indicates "on course" as to the vertical position of the aircraft.

If the airplane moves above or below the plane of the equisignal reference path 16, the amplitude of one of the two modulating square wave signals will be larger than the other. The resulting signal at the output of the AM detector 44 is a square wave having an amplitude proportional to the difference in amplitude of the two modulating signals, and having a phase determined by the predominant signal. By means of the phase selector circuit 52, a D. C. error voltage is derived from the output of the AM detector 44 having a polarity determined by the phase relationship between the square wave signal at the output of the AM detector 44 and the reference square wave signal derived from the multivibrator 48.

Again assuming the aircraft is on the equisignal reference path 16, by modulating the gain of the stages 38 and 40 of the second I. F. amplifier with a square wave of the same frequency as the modulating signals of the two lobes and which is selected to be in phase with either one or the other of these modulating signals, the resulting output signal at the AM detector 44 is no longer zero, but is a square wave of predetermined phase and amplitude, depending upon the selected tap of the attenuator 62. The resulting indication on the cross-pointer meter 56 instructs the pilot to deviate the path of the aircraft from the zero reference path 16 to an elevation where the difference in amplitude of the incoming modulating square waves exactly offsets the gain modulation introduced from the attenuator 62. Thus, by varying the phase and amplitude of the gain modulating signal, the aircraft can be made to fly any one of a number of preselected glide paths. Such glide paths are indicated by the dash lines in Fig. 1.

From the above description, it will be appreciated that the objects of the invention have been achieved by providing a manually operated glide angle selector means in combination with an aircraft instrument-landing receiver. By injecting the reference square wave into the I. F. amplifier to modulate the I. F. signal, any changes in the automatic gain control characteristic, detector efficiency, and/or amplifier gain, do not affect the original nor the modified signal modulation, and while variations of these receiver properties from receiver to receiver, or in one receiver over a period of time may change the sensitivity, they do not effect a change in the position of the glide angle relative to the reference (equisignal) glide path. The result is a highly stable and accurate indication of the "on course" position for any selected glide path. The sensitivity of the meter to indicate deviation from the desired path can be regulated independently without introducing "on course" errors provided the change in overall gain required to change the meter sensitivity be accomplished in any manner which will not affect the signal modulation.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An aircraft instrument-landing receiver adapted to produce an indication of the relative position of the aircraft with respect to an electromagnetically defined reference path, said receiver including an intermediate frequency amplifier, a frequency modulation detector coupled to the output of said amplifier, a bistable multivibrator triggered by the output signal of the frequency modulation detector, said multivibrator generating a square wave reference voltage, a step-type grounded centerpoint attenuator, opposite ends of the attenuator being respectively coupled to opposite phases of the multivibrator, and a selector switch for tapping off an attenuated square wave signal of either phase from the attenuator, said switch coupling the attenuated square wave signal to at least one stage of the intermediate frequency amplifier for modulating the gain of said amplifier.

2. An aircraft instrument-landing receiver adapted to produce an indication of the relative positition of the aircraft with respect to an electromagnetically defined reference path, said receiver including amplifying means, detecting means coupled to the output of said amplifying means, a bistable multivibrator triggered by the output signal of the detector means, said multivibrator generating a square wave reference voltage, a step-type grounded centerpoint attenuator, opposite ends of the attenuator being respectively coupled to opposite phases of the multivibrator, and a selector switch for tapping off an attenuated square wave signal of either phase from the attenuator, said switch coupling the attenuated square wave signal to at least one stage of the amplifying means for modulating the gain of said amplifying means.

3. An aircraft instrument-landing receiver adapted to produce an indication of the relative position of the aircraft with respect to an electromagnetically defined reference path, said receiver including an intermediate frequency amplifier, a frequency modulation detector coupled to the output of said amplifier, a square wave generating means synchronized by the output signal of the frequency modulation detector, said generating means producing a square wave reference voltage, a step-type grounded centerpoint attenuator, opposite ends of the attenuator being respectively coupled to opposite phases of said generating means, and a selector switch for tapping off an attenuated square wave signal of either phase from the attenuator, said switch coupling the attenuated square wave signal to at least one stage of the intermediate frequency amplifier for modulating the gain of said amplifier.

4. An aircraft instrument-landing receiver adapted to produce an indication of the relative position of the aircraft with respect to an electromagnetically defined reference path, said receiver including an intermediate frequency amplifier, a frequency modulation detector coupled to the output of said amplifier, a bistable multivibrator triggered by the output signal of the frequency modulation detector, said multivibrator generating a square wave reference voltage, an attenuator, opposite ends of the attenuator being respectively coupled to opposite phases of the multivibrator, and switching means for tapping off an attenuated square wave signal of either phase from the annenuator, said switching means coupling the attenuated square wave signal to at least one stage of the intermediate frequency amplifier for modulating the gain of said amplifier.

5. In a superheterodyne receiver for a microwave landing system, means for amplifying the receiver input signal, means for detecting a reference portion of the amplified input signal, square wave generating means having an output frequency controlled by and synchronized with the output of said detecting means, the amplitude of the square wave output signal being independent of any received signal, and a variable attenuator across the output of said generating means, the output of said attenuator being connected to at least one stage of the amplifying means for modulating the gain of said amplifying means.

6. In a superheterodyne receiver for a microwave landing system, means for amplifying the receiver input signal, means for detecting a reference portion of the amplified input signal, means for generating a reference voltage having a frequency controlled by the output of said detecting means and an amplitude independent of the amplitude of any received signals, and an attenuator across the output of said generating means, the output of said attenuator being connected to at least one stage of the amplifying means for modulating the gain of said amplifying means.

7. In an aircraft instrument-landing superheterodyne receiver having an I. F. amplifier and adapted to produce an indication of the displacement of the aircraft from an electro-magnetically defined instrument landing path, means for providing manual selection of any one of a number of landing paths of predetermined fixed displacement from said electromagnetically defined landing path, said means comprising a multivibrator, a step-type grounded-centerpoint attenuator, opposite ends of the attenuator being respectively coupled to opposite phases of the multivibrator, and a selector switch connecting any of the step positions of the attenuator to one or more stages of the I. F. amplifier for varying the stage gain whereby the amplitude of the I. F. carrier is square wave modulated a predetermined amount.

8. In an aircraft instrument-landing superheterodyne receiver having an I. F. amplifier and adapted to produce an indication of the displacement of the aircraft from an electromagnetically defined instrument landing path, means for providing manual selection of any one of a number of landing paths of predetermined fixed displacement from said electromagnetically defined landing path, said means comprising means for generating a reference voltage signal, a step-type, grounded-centerpoint attenuator, opposite ends of the attenuator being respectively coupled across the output of said reference voltage generating means, and a selector switch connecting any of the step positions of the attenuator to one or more stages of the I. F. amplifier for varying the stage gain whereby the amplitude of the I. F. carrier is amplitude modulated to a selected degree.

9. An aircraft instrument-landing receiver adapted to produce an indication of the relative position of the aircraft with respect to an electromagnetically defined reference path, said receiver including radio receiving means having at least one stage of amplification, means responsive to a portion of the receiver input signal and synchronized thereby for producing a reference voltage signal, a phase detector coupled to the output of the receiving means and having the reference signal applied thereto, the phase detector producing an output signal indicative of the position of the aircraft relative to said reference path, and means responsive to the reference voltage signal for selectively modulating the amplification of the receiving means whereby a fixed deviation from the reference path can be established.

10. In combination, radio receiving means having at least one stage of amplification, a phase detector coupled to the output of said receiving means, means associated with the receiver for supplying a phase reference voltage signal to the phase detector, and means responsive to said reference signal supplying means for selectively modulating the amplification of the receiving means.

11. In a superheterodyne receiver for a microwave landing system, means for amplifying the receiver input signal, means for detecting a reference portion of the amplified input signal, means timed by the output of said reference portion detecting means and independent of received signal amplitude for providing a predetermined-amplitude square-wave voltage, and means including a coupling between said predetermined-voltage providing means and at least one stage of said amplifying means for providing a predetermined gain modulation of the receiver irrespective of input signal strength variations.

JOHN CHARLTON.

References Cited in the file of this patent

UNITED STATES PATENTS

| Number | Name | Date |
|---|---|---|
| 2,170,852 | Chireix | Aug. 29, 1939 |
| 2,485,642 | Newitt | Oct. 25, 1949 |
| 2,510,097 | Frum | June 6, 1950 |